United States Patent
Theurillat

(10) Patent No.: US 10,099,293 B2
(45) Date of Patent: Oct. 16, 2018

(54) EQUIPMENT WITH A DETACHABLE ACCESSORY AND ASSEMBLY FOR A MACHINING LATHE, AND MACHINING LATHE WITH DIGITAL CONTROL

(71) Applicant: Tornos SA, Moutier (CH)

(72) Inventor: Marc Theurillat, Delémont (CH)

(73) Assignee: TORNOS SA, Moutier (CH)

( * ) Notice: Subject to any disclaimer, the term of this patent is extended or adjusted under 35 U.S.C. 154(b) by 6 days.

(21) Appl. No.: 15/058,881

(22) Filed: Mar. 2, 2016

(65) Prior Publication Data
US 2016/0256932 A1  Sep. 8, 2016

(30) Foreign Application Priority Data
Mar. 3, 2015 (EP) .................................. 15157458

(51) Int. Cl.
| | | |
|---|---|---|
| *B23B 11/00* | (2006.01) | |
| *B23B 43/00* | (2006.01) | |
| *B23B 39/16* | (2006.01) | |
| *B23B 3/06* | (2006.01) | |

(Continued)

(52) U.S. Cl.
CPC .............. *B23B 11/00* (2013.01); *B23B 3/065* (2013.01); *B23B 39/162* (2013.01); *B23B 43/00* (2013.01); *B23Q 1/623* (2013.01); *B23Q 39/022* (2013.01)

(58) Field of Classification Search
CPC ............ Y10T 82/2506; Y10T 82/2508; Y10T 82/2585; Y10T 82/2587; Y10T 82/2591; Y10T 408/37; Y10T 29/5154; Y10T 29/5155; Y10T 29/5114; B23B 39/20; B23B 39/205; B23B 29/24; B23B 29/242; B23B 29/248; B23B 29/32; B23B 7/04; B23Q 5/045; B23Q 5/5406; B23Q 2220/002

See application file for complete search history.

(56) References Cited

U.S. PATENT DOCUMENTS 4,576,069 A * 3/1986 Bazuin .................. B23Q 11/08
408/2
5,168,614 A * 12/1992 Thumm ............... B23Q 1/0009
29/40

(Continued)

FOREIGN PATENT DOCUMENTS

| DE | 3702424 A1 | 8/1988 |
|---|---|---|
| DE | 4236686 C1 | 2/1994 |

(Continued)

OTHER PUBLICATIONS

European Search Report for European Application No. 15157458.9, dated Sep. 14, 2015, 10 pages.

*Primary Examiner* — Nicole N Ramos
(74) *Attorney, Agent, or Firm* — Pearne & Gordon LLP

(57) ABSTRACT

An equipment for a machining lathe with digital control comprising a movable carriage, a tool support system with integrated drive which is mounted so as to pivot on this movable carriage so as to be able to pivot about a pivot axis, as well as a device for actuating the tool support system with integrated drive with respect to the movable carriage. The tool support system with integrated drive comprises at least one mounting location to detachably receive a detachable accessory to support and drive a tool.

15 Claims, 6 Drawing Sheets

Figure 1A:
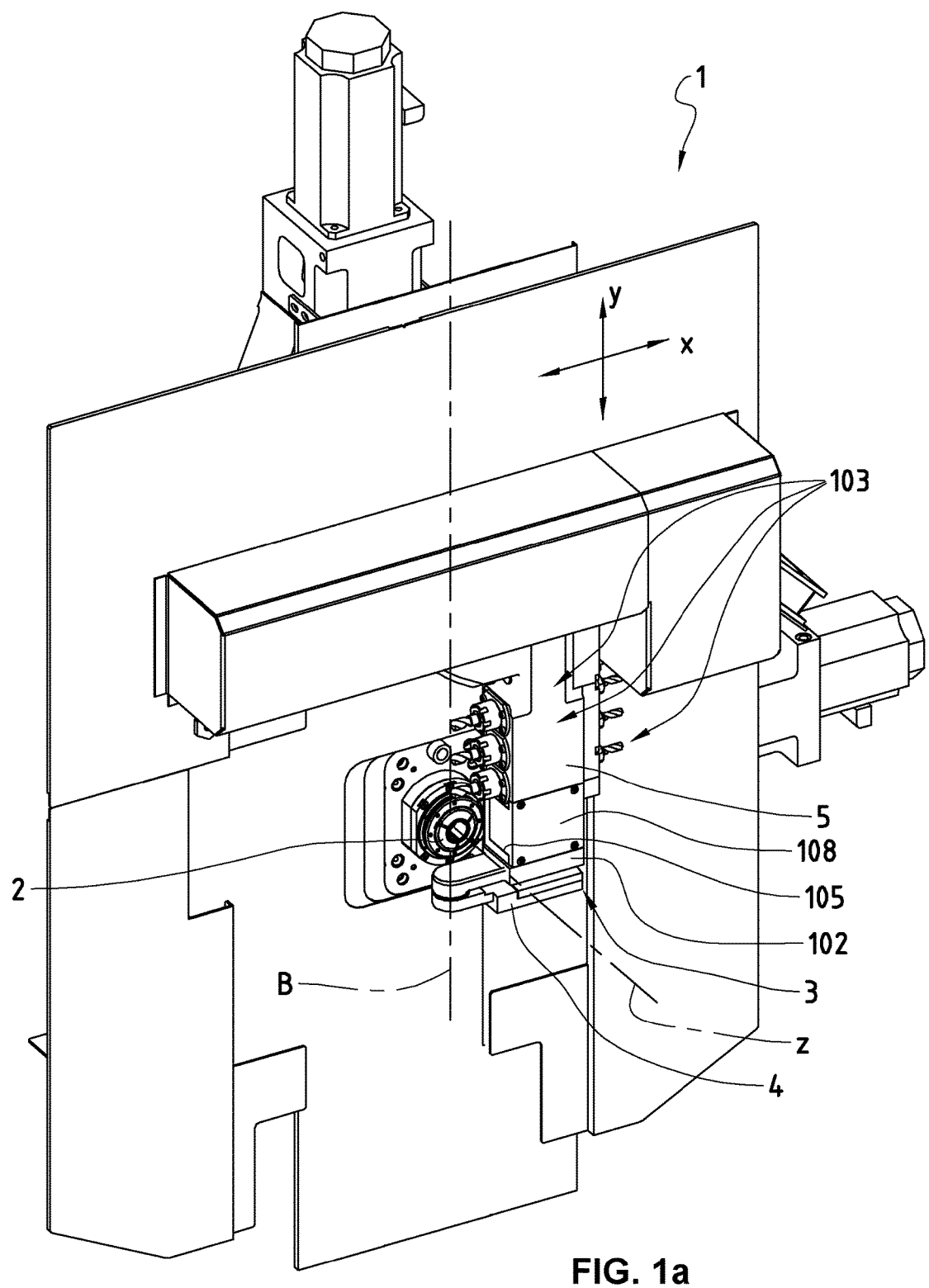

(51) Int. Cl.
 *B23Q 1/62* (2006.01)
 *B23Q 39/02* (2006.01)

(56) References Cited

U.S. PATENT DOCUMENTS

| | | | | |
|---|---|---|---|---|
| 7,395,589 | B1 * | 7/2008 | Kuo | B23B 29/242 |
| | | | | 29/33 J |
| 2002/0032107 | A1 * | 3/2002 | Sheehan | B23Q 1/38 |
| | | | | 29/48.5 A |
| 2006/0254384 | A1 * | 11/2006 | Lu | B23Q 16/102 |
| | | | | 74/813 R |
| 2009/0087270 | A1 * | 4/2009 | Nakamura | B23Q 16/102 |
| | | | | 408/35 |
| 2010/0307301 | A1 * | 12/2010 | Zwara | B23B 29/24 |
| | | | | 82/158 |
| 2011/0094355 | A1 * | 4/2011 | Sheehy | B23B 29/205 |
| | | | | 82/159 |
| 2011/0154963 | A1 * | 6/2011 | Aoyagi | B23Q 16/102 |
| | | | | 82/159 |
| 2012/0103150 | A1 * | 5/2012 | Fukuoka | B23B 3/162 |
| | | | | 29/27 C |
| 2015/0040732 | A1 * | 2/2015 | Ozawa | B23Q 5/045 |
| | | | | 82/121 |
| 2015/0258615 | A1 * | 9/2015 | Suzuyama | B23B 3/162 |
| | | | | 409/197 |

FOREIGN PATENT DOCUMENTS

| | | |
|---|---|---|
| DE | 19940330 A1 | 3/2001 |
| EP | 0416611 A2 | 3/1991 |
| EP | 0999002 A1 | 5/2000 |
| EP | 1270145 A2 | 1/2003 |
| EP | 1520657 A1 | 4/2005 |
| EP | 1930111 A1 | 6/2008 |
| WO | 2006094712 A2 | 9/2006 |
| WO | 2008013313 A1 | 1/2008 |

* cited by examiner

EQUIPMENT WITH A DETACHABLE ACCESSORY AND ASSEMBLY FOR A MACHINING LATHE, AND MACHINING LATHE WITH DIGITAL CONTROL

TECHNICAL FIELD OF THE INVENTION

The present invention relates to the field of machining using a lathe with digital control. More precisely, it relates to an equipment and an assembly for a machining lathe with digital control, as well as to such a machining lathe with digital control.

PRIOR ART

Most machining operations carried out by a lathe take place by rotating the material to be machined with respect to a tool which cuts into the material passing in front of it by reason of this rotation.

Some shapes cannot be produced by such a procedure. This is the case e.g. with lateral flats or with holes which have an axis inclined with respect to the axis of rotation of the mandrel for holding and driving the material to be machined.

A lathe with digital control can comprise an additional equipment by virtue of which, while the piece being manufactured is still held in the lathe, it is possible to produce, on this piece, inclined holes or lateral flats which could not be obtained by machining requiring that the material be rotationally driven. Such an additional equipment is generally referred to as the "B axis" owing to the fact that at that location it effects a pivoting movement about an axis which is itself also referred to as the "B axis". In this equipment, a movable carriage bears a tool support system with integrated drive. This tool support system with integrated drive can pivot and is generally provided with a plurality of turning tools, each one of these still being either a cutter or a drill bit. These turning tools carry out movements which the movable carriage is caused to make. They have an orientation which can be adjusted by causing the tool support system with integrated drive to pivot with respect to the movable carriage. By virtue thereof, certain shapes with particular orientations or other specificities can be produced.

In the additional equipment described above, each tool is borne by a rotary device which is a constituent and permanent part of the tool support system with integrated drive. The additional equipment described above offers machining possibilities which are fixed from the outset, being limited to drilling and cutting, the drilling and cutting having as a common principle the rotation of a tool about its axis.

The additional equipment described above is not the only one known. In particular, devices which perform a helical movement are also known, making it possible to produce internal or external threads and being referred to as thread cutters. Machining operations using these devices require prior manual adjustments which are time-consuming and complicated. The same disadvantage is also found on another type of additional equipment, i.e. devices for forming polygons which serve to produce pieces with a polygonal cross-section.

SUMMARY OF THE INVENTION

According to one aspect of the present invention, an equipment for a machining lathe with digital control is provided. This equipment preferably comprises a movable carriage, a tool support system with integrated drive which is mounted on this movable carriage so as to be able to pivot about a pivot axis, as well as an actuating device able to cause the tool support system with integrated drive to pivot with respect to the movable carriage, about the pivot axis. The tool support system with integrated drive preferably comprises at least one mounting location to detachably receive at least one detachable accessory to support and drive a tool.

One object of the features of the invention is to make it possible for a lathe to offer more machining possibilities requiring only prior operations (adjustment or the like) which are simple to carry out.

Various types of detachable accessories can be installed at the mounting location. For example, the detachable accessory can be a thread cutter. Once this thread cutter is installed on the tool support system with integrated drive of the equipment in accordance with the invention, its movements, orientation and operation are controlled in an automated manner by the computer of the machining lathe with digital control. Various types of detachable accessories can thus undergo automated adjustment and automated control.

A lathe equipped with an equipment in accordance with the invention also has the advantage of being highly versatile. This high level of versatility does not need to be associated with an increased take-up of space within the cabinet of the lathe since the invention makes it possible for there not to be as many supports fixed to the frame of the lathe as there are usable machining accessories.

The high level of versatility achieved by the invention also does not need to be associated with an excessive increase in complexity in the machining lathe itself since this lathe can make use of more devices than it incorporates. For example, the lathe to which the invention is applied can make use of a device for forming polygons and then a thread cutter without being permanently equipped with both at the same time.

The equipment defined above can incorporate one or a plurality of other advantageous features, in isolation or in combination, in particular from among those defined below.

The tool support system with integrated drive advantageously comprises means allowing rapid fixing of the detachable accessory at the mounting location.

The equipment advantageously comprises a permanent drive device comprising engaging means making it possible to establish a kinematic connection to communicate drive from this permanent drive device to the detachable accessory. When such is the case, the detachable accessory does not need to have its own motorisation means, which can translate into a simplification in particular of the electric cabling, reduced costs, a saving in terms of weight and/or a saving in terms of space.

The engaging means advantageously comprise a circular arrangement of teeth for meshing with complementary teeth on a rotary input member of the detachable accessory. During installation of the detachable accessory, the engagement of the complementary teeth takes place almost automatically and in a reliable manner, which is advantageous in terms of mounting ergonomics.

The equipment advantageously comprises at least one permanent sub-assembly for supporting and driving a tool.

The permanent drive device advantageously comprises a mechanism for transmitting drive to the detachable accessory, this transmission mechanism comprising a rotary part which is a constituent part of the permanent sub-assembly for supporting and driving a tool. When such is the case, the transmission of the same drive to the detachable accessory and at the same time to the permanent subassembly for supporting and driving a tool can be achieved by means of a simpler transmission mechanism.

The equipment is advantageously provided with the detachable accessory which is detachably fixed at the mounting location.

The detachable accessory is advantageously selected from among a drilling or a cutting accessory, a thread-forming accessory with helical movement and a polygon-forming accessory.

The invention also relates to an assembly for a machining lathe with digital control, which comprises an equipment as defined above as well as a set of several interchangeable accessories, each of which can be fixed at the mounting location and constitutes a detachable accessory for support and driving of a tool.

The invention also relates to a machining lathe with digital control which comprises an equipment as defined above.

The machining lathe advantageously comprises a mandrel for holding and driving a material to be machined, this mandrel being able to rotate about an axis of rotation, the movable carriage which is a constituent part of the equipment being displaceable in two translational directions non-parallel with the axis of rotation of the mandrel, the pivot axis of the tool support system with integrated drive being non-parallel with the axis of rotation of the mandrel.

SUMMARY DESCRIPTION OF THE DRAWINGS

Figure 1B:
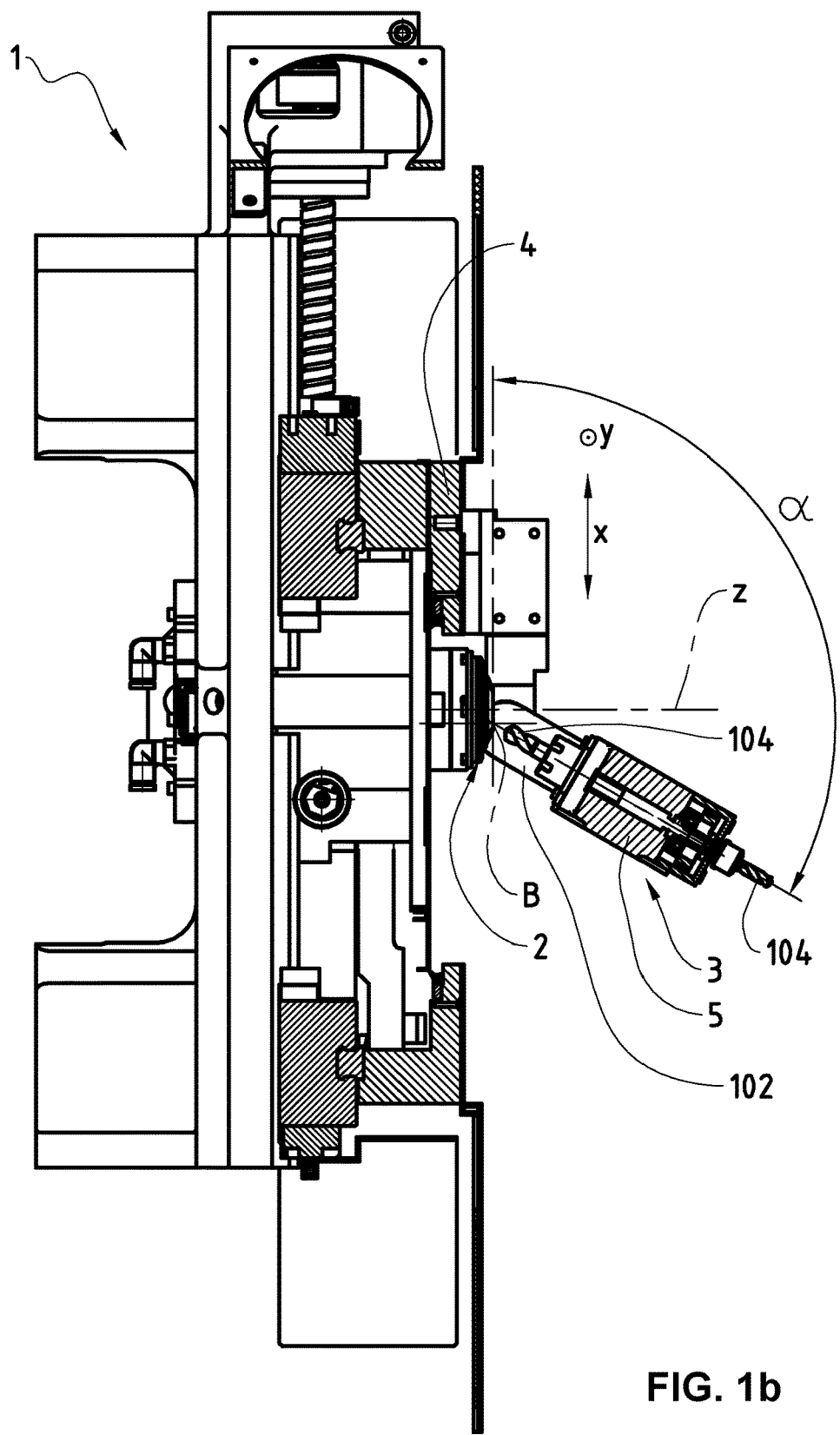
Figure 2:
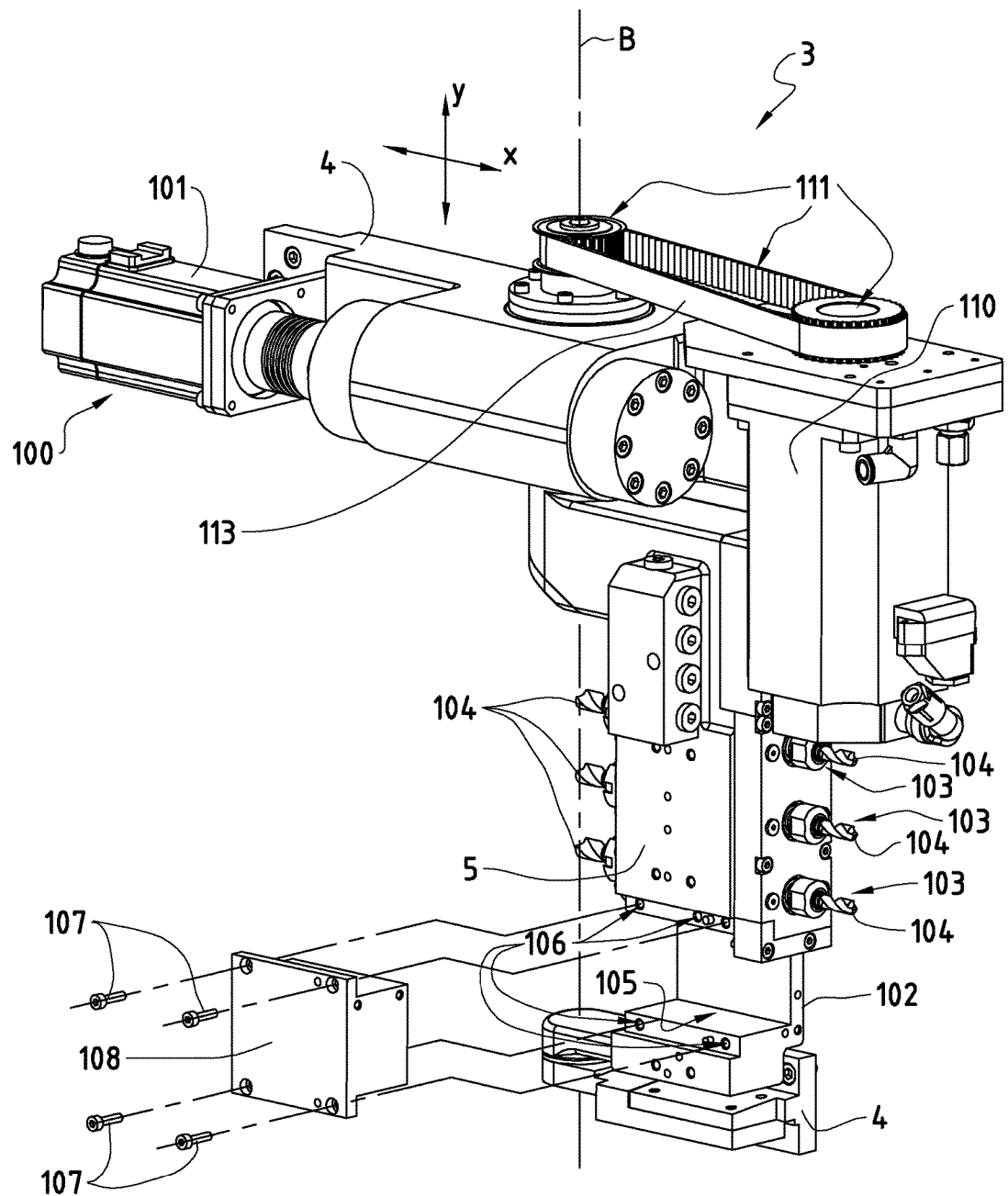
Figure 3:
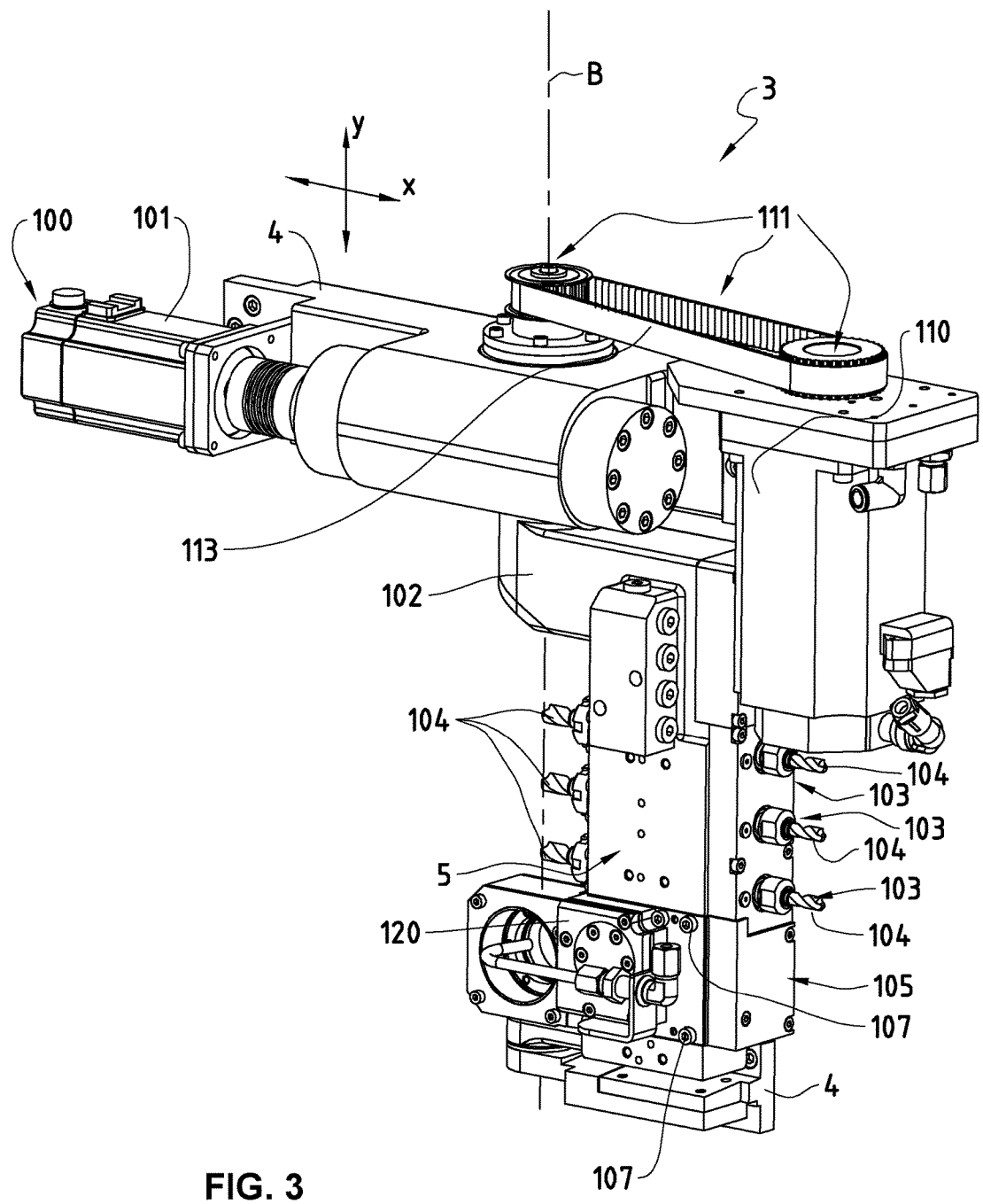
Figure 4:
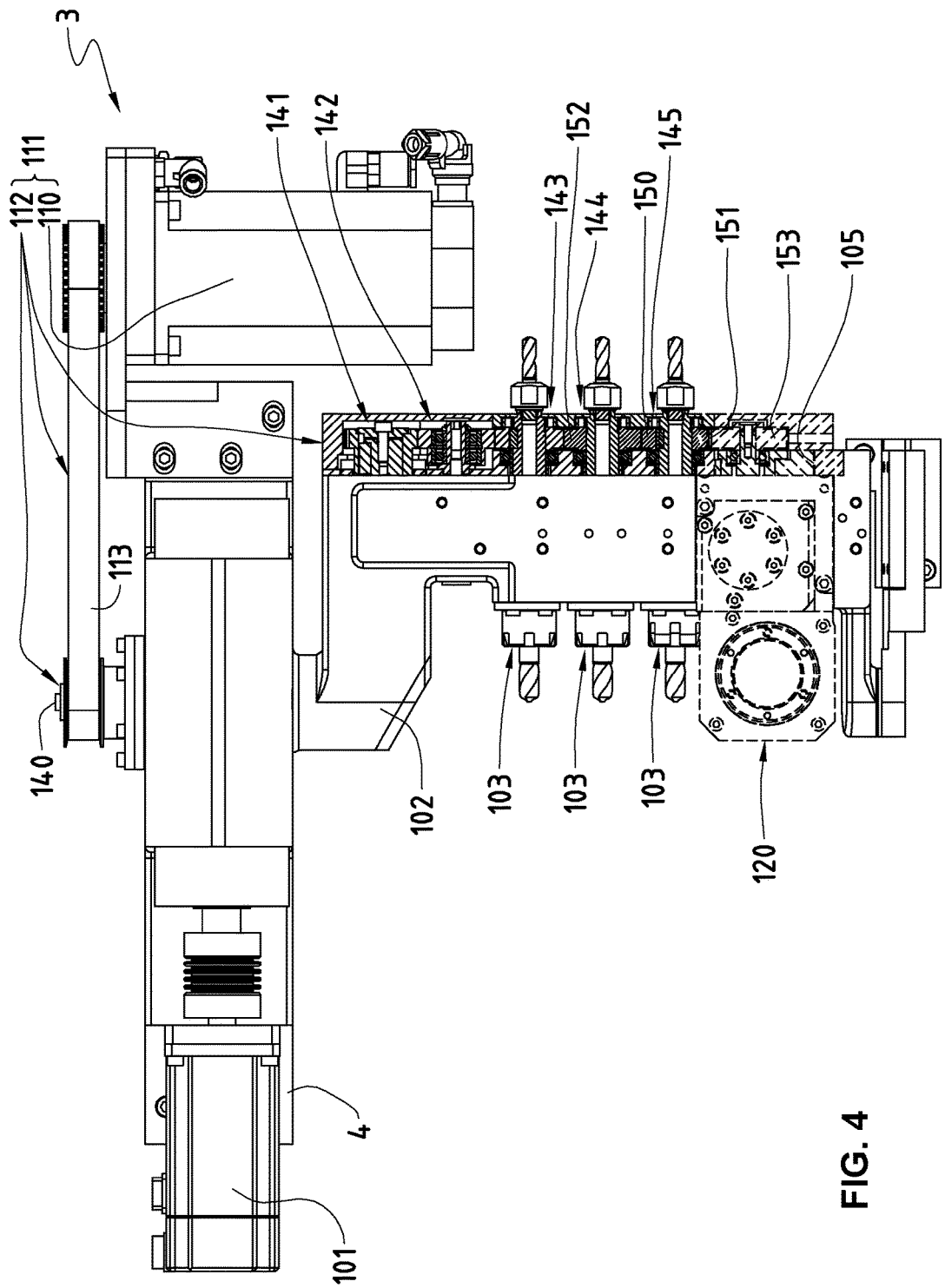
Figure 5:
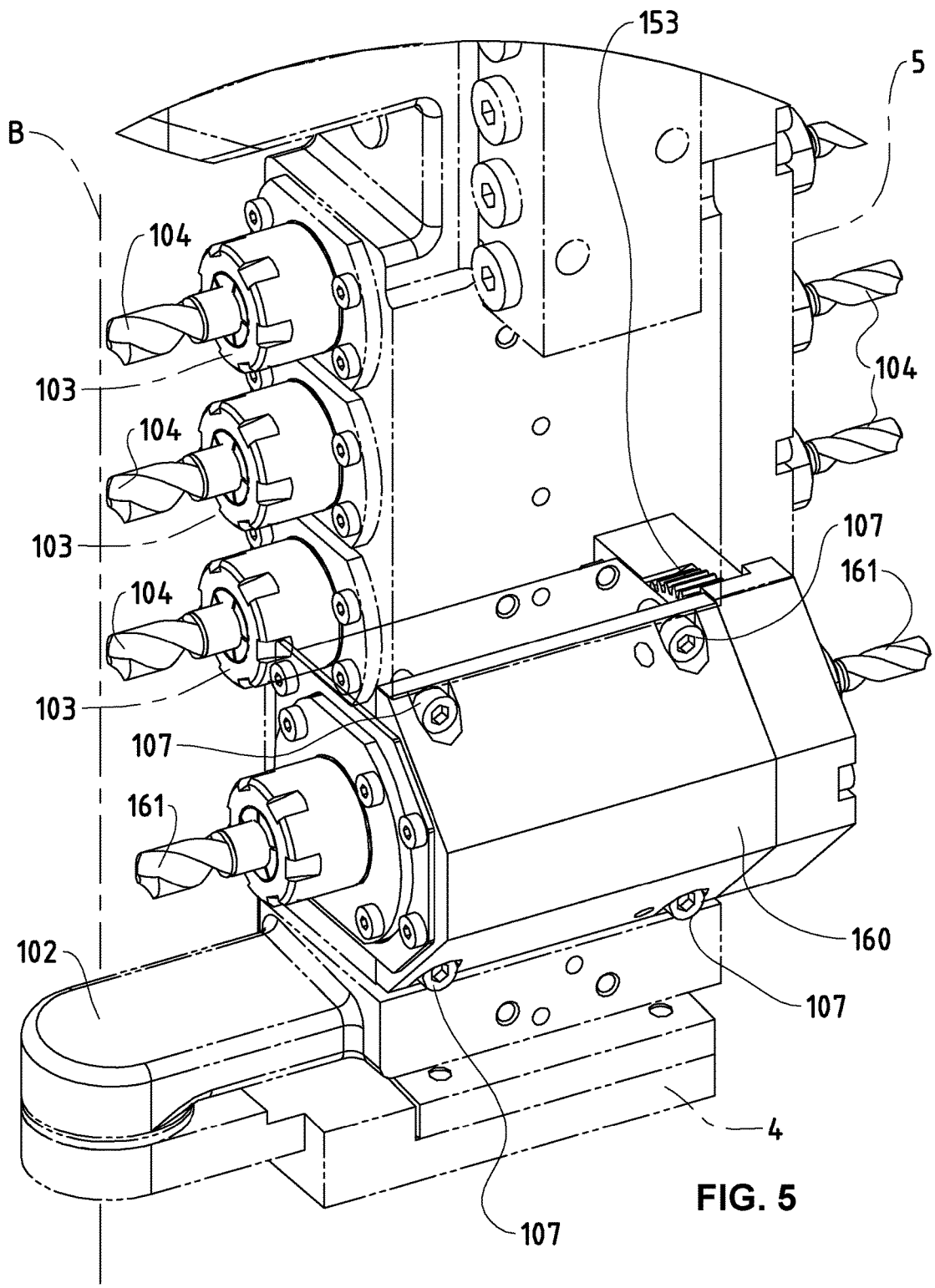

Other advantages and features will become clearer from the following description of a particular embodiment of the invention given by way of non-limiting example and illustrated in the attached drawings in which:

FIG. 1a is a perspective view of a lathe with digital control in accordance with the invention, FIG. 1b is a view from above and in cross-section in a horizontal plane and shows the same lathe as FIG. 1a, a tool support system with integrated drive for this lathe having a position which differs between FIGS. 1a and 1b, FIG. 2 is a partially exploded perspective view of the major part of an equipment in accordance with the invention and provided for the lathe of FIG. 1, FIG. 3 is a perspective view which illustrates the equipment of FIG. 2 in the case where a detachable accessory, i.e. a thread-cutter, is detachably mounted on this equipment, FIG. 4 is a side view, cut away, and, as in FIG. 3, illustrates the equipment of FIG. 2 provided with the thread-cutter, and FIG. 5 is a partial view, in perspective, which illustrates a detachable accessory for drilling and/or cutting as detachably mounted in place of the thread-cutter, on a tool support system with integrated drive which is a constituent part of the equipment of FIG. 2 and is indicated with a dot-dash line.

DESCRIPTION OF A PREFERRED EMBODIMENT OF THE INVENTION

In FIG. 1 as in FIG. 2, only some constituent parts of a lathe with digital control 1 in accordance with the invention are shown, the parts of this lathe 1 which are not shown being known per se. The lathe 1 comprises a rotary mandrel 2, the axis of rotation of which is referenced Z and which is provided to support and rotationally drive a material to be machined, not shown.

The lathe 1 also comprises an equipment 3 which is in accordance with the invention while being of the so-called "B axis" type of equipment. The equipment 3 comprises a movable carriage 4 which can be displaced in a vertical plane in two perpendicular translational directions, i.e. a horizontal translational direction X and a vertical translational direction Y. The movable carriage 4 is guided and displaced in the X and Y translational directions by means which are well known to the person skilled in the art. When the movable carriage 4 is also displaceable in a translational direction in parallel with the axis of rotation Z, it can also be guided and displaced in parallel with this axis of rotation Z by means well known to the person skilled in the art.

According to FIG. 2, the equipment 3 is illustrated alone and without a part of its movable carriage 4. This movable carriage 4 bears a plurality of sub-assemblies, including a tool support system with integrated drive 5 which pivots on a vertical pivot axis B with respect to the movable carriage. A device 100 for actuating the tool support system with integrated drive 5 with respect to the movable carriage 4 comprises a motor 101, as well as a wheel-and-endless screw mechanism concealed by a casing in the attached drawings. This actuating device 100 is able to effect positioning of the tool support system with integrated drive 5 in any selected one of a number of working positions which are angularly offset with respect to one another about the pivot axis B.

The tool support system with integrated drive 5 comprises a bent arm 102, in one vertical portion of which there are three permanent sub-assemblies 103 one behind the other which are identical to one another and each of which is more precisely a sub-assembly 103 for supporting and driving one or two rotary tools 104. In the illustrated example, each rotary tool 104 is a drill bit. However, at least one part of the rotary tools 104 may not be drill bits but be of another type. For example, any one of the rotary tools 104 may be a cutter.

Following and below the permanent sub-assemblies for support and driving 103, the bent arm 102 of the tool support system with integrated drive 5 comprises a mounting location 105 which is provided for detachable reception of a detachable accessory for supporting and driving a tool. In the illustrated example, the mounting location 105 is in the form of a housing and this housing is open at the side for placement and removal of the detachable accessory. Around the mounting location 105, a plurality of threaded holes 106 form means permitting rapid fixing of the detachable assembly. Each of them is intended to receive a screw 107 for fixing the detachable accessory to the tool support system with integrated drive 5 by clamping. The threaded holes 106 and the screws 107 can be replaced or complemented by other rapid fixing means such as fixing means operating by snap-equipment.

When no detachable accessory is fitted to the tool support system with integrated drive 5, a protection piece 108 can be provisionally installed so as to close and/or fill the mounting location 105.

Also in FIG. 2, the movable carriage 4 bears a drive motor 110 which forms part of a permanent device 111 for driving rotary tools 104. Apart from the drive motor 110, the permanent drive device 111 comprises a transmission mechanism 112, a transmission belt 113 of which can be seen in FIG. 2.

In FIG. 3, the mounting location 105 is occupied by a thread-cutter 120 which is a detachable machining accessory which performs a helical movement permitting internal or external threads to be produced. The operating principle of a thread-cutter is known per se and so, for the sake of simplicity, it will not be described herein. Being detachable, the thread-cutter 120 can be replaced by another detachable accessory. In fact, it forms part of a set of several interchangeable accessories, each one of which can be fixed at the mounting location 105. Apart from the thread-cutter 120, this set can comprise other thread-cutters, one or a plurality of drilling accessories, one or a plurality of cutting accessories and one or a plurality of polygon-forming accessories.

In FIG. 4, the transmission mechanism 112 comprises a succession of rotary units 140, 141, 142, 143, 144, 145 which mesh with one another, the transmission belt 113 coupling the rotary unit 140 to the drive motor 110. Each of the rotary units 143, 144 and 145 has the feature of constituting the rotary part of a permanent support and drive sub-assembly 103. The rotary unit 145 is located at the end of the transmission mechanism 112 and comprises a toothed wheel 150, the circular arrangement of teeth 151 of which meshes at the same time with a toothed wheel 152 of the rotary unit 144 and a toothed wheel 153 forming a rotary input member of the thread-cutter 120. The drive produced by the drive motor 110 is a common drive which is transmitted to all the permanent support and drive sub-assemblies 103 as well as to the detachable accessory 120. The transmission of this drive as far as the detachable accessory 120 is effected via the permanent support and drive sub-assemblies 103.

When the thread-cutter 120 is withdrawn, the toothed wheel 153 easily disengages from the circular arrangement of teeth 151. Conversely, during installation of the thread-cutter 120 on the tool support system with integrated drive 5, the toothed wheel 153 easily meshes with the toothed wheel 150. The circular arrangement of teeth 151 thus forms engagement means permitting a kinematic connection to be easily established in order to communicate drive between the transmission mechanism 112 and the thread-cutter 120.

The computer of the lathe with digital control 1 controls the equipment 3, in particular the motor 101 and the drive motor 110.

In FIG. 5, only a lower portion of the tool support system with integrated drive 5 is illustrated, being shown by dot-dash lines. It is more precisely indicated by its outer edges normally visible from the viewpoint chosen for the embodiment of FIG. 5. In this FIG. 5, the mounting location 105 is occupied by a detachable accessory 160 which replaces the thread-cutter 120 and which is more precisely an accessory for supporting and driving two drill bits 161, each being able to be replaced by a cutter.

The detachable accessory 160 is entirely visible in FIG. 5, including through the tool support system with integrated drive 5 which is illustrated as if it were transparent.

The pivot axis B is substantially orthogonal to the axis of rotation Z of the rotary mandrel 2. In FIG. 2, the arc α symbolises the angular range through which the working positions which can be occupied by the tool support system with integrated drive 5 pass in succession. By means of pivoting of this tool support system with integrated drive 5 about the B axis, the orientation of the rotary tools 104 and of the detachable accessory 120 or 160 present on the tool support system with integrated drive 5 can be modified with respect to the material being machined, held by the rotary mandrel 2. From the data which an operator has entered into the computer control unit of the lathe 1, the adjustment of the position of the thread-cutter 120 or of another detachable accessory detachably mounted on the tool support system with integrated drive 5 is effected in an automated manner and not manually, which can translate into a time saving, increased efficiency and/or increased precision.

The angular position of the tool support system with integrated drive 5 with respect to the movable carriage 4 can be adjusted before a machining operation, then be fixed during this machining operation. According to another operation, the tool support system with integrated drive 5 can be actuated in a pivoting movement about the B axis during a machining operation, this pivoting movement also being able to be combined with other movements such as translational movements of the movable carriage 4 in parallel with the translational axis X and/or the translational axis Y and/or the axis of rotation Z.

The invention claimed is:

1. Equipment for a machining lathe with digital control, the equipment comprising:
a movable carriage,
a tool support system with integrated drive which is mounted on the movable carriage so as to be able to pivot about a pivot axis and which comprises at least one mounting location to detachably receive at least one detachable accessory to support and drive a tool, and a plurality of permanent sub-assemblies each for supporting and driving at least one rotary tool,
an actuating device able to cause the tool support system with integrated drive to pivot with respect to the movable carriage, about the pivot axis,
a permanent drive device comprising engaging means making it possible to establish a kinematic connection to communicate drive from the permanent drive device to the detachable accessory, and a transmission mechanism for driving the detachable accessory,
the transmission mechanism comprising rotary units each of which is part of one of the permanent sub-assemblies in such a way that the driving of the detachable accessory is effected via the permanent sub-assemblies,
wherein the rotary units of the permanent sub-assemblies are in succession with one another and mesh with one another.

2. The equipment as claimed in claim 1, wherein the tool support system with integrated drive comprises means allowing rapid fixing of the detachable accessory at the mounting location.

3. The equipment as claimed in claim 1, wherein the engaging means comprise a circular arrangement of teeth for meshing with complementary teeth on a rotary input member of the detachable accessory.

4. The equipment as claimed in claim 1, further comprising at least one permanent sub-assembly for supporting and driving a tool.

5. The equipment as claimed in claim 1, further comprising at least one permanent sub-assembly for supporting and driving a tool, the permanent drive device comprising a mechanism for transmitting drive to the detachable accessory, the transmission mechanism comprising a rotary part which is a part of the permanent sub-assembly for supporting and driving a tool.

6. The equipment as claimed in claim 1, the equipment being provided with the detachable accessory which is detachably fixed at the mounting location.

7. The equipment as claimed in claim 6, wherein the detachable accessory is selected from among a drilling or a cutting accessory, a thread-forming accessory with helical movement and a polygon-forming accessory.

8. The equipment as claimed in claim 1, wherein the mounting location is in succession with the permanent sub-assemblies.

9. The equipment as claimed in claim 1, wherein one of the rotary units of the permanent sub-assemblies comprises a circular arrangement of teeth for meshing with complementary teeth on a rotary input member of the detachable accessory.

10. The equipment as claimed in claim 9, wherein the circular arrangement of teeth of said one rotary unit meshes with a toothed wheel of another of the rotary units of the permanent sub-assemblies.

11. The equipment as claimed in claim 1, wherein the pivot axis of the tool support system with integrated drive is substantially vertical with respect to the moveable carriage, the tool support system with integrated drive comprising a bent arm in one vertical portion of which the permanent sub-assemblies are in succession with one another, said vertical portion being offset with respect to the pivot axis of the tool support system with integrated drive.

12. The equipment as claimed in claim 1, comprising a protection piece temporarily mounted so as to close and/or fill the mounting location.

13. An assembly for a machining lathe with digital control, further comprising the equipment as claimed in claim 1 as well as a set of several interchangeable accessories, each of which is fixable at the mounting location and constitutes a detachable accessory for support and driving of a tool.

14. A machining lathe with digital control, comprising the equipment as claimed in claim 1.

15. The machining lathe as claimed in claim 14, further comprising a mandrel for holding and driving a material to be machined, the mandrel being able to rotate about an axis of rotation, the movable carriage which is a constituent part of the equipment being displaceable in two translational directions non-parallel with the axis of rotation of the mandrel, the pivot axis of the tool support system with integrated drive being non-parallel with the axis of rotation of the mandrel.

* * * * *